(12) United States Patent
Patil

(10) Patent No.: US 10,664,696 B2
(45) Date of Patent: May 26, 2020

(54) SYSTEMS AND METHODS FOR CLASSIFICATION OF SOFTWARE DEFECT REPORTS

(71) Applicant: Tata Consultancy Services Limited, Mumbai (IN)

(72) Inventor: Sangameshwar Suryakant Patil, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 316 days.

(21) Appl. No.: 15/934,855

(22) Filed: Mar. 23, 2018

(65) Prior Publication Data
US 2018/0307904 A1 Oct. 25, 2018

(30) Foreign Application Priority Data
Apr. 19, 2017 (IN) ............................. 201721013935

(51) Int. Cl.
*G06F 16/00* (2019.01)
*G06K 9/00* (2006.01)
(Continued)

(52) U.S. Cl.
CPC ....... *G06K 9/00463* (2013.01); *G06F 16/355* (2019.01); *G06F 16/93* (2019.01);
(Continued)

(58) Field of Classification Search
CPC .. G06K 9/00463; G06K 9/6224; G06K 9/628; G06F 16/93; G06F 16/355; G06F 40/289; G06F 40/30
(Continued)

(56) References Cited

U.S. PATENT DOCUMENTS 7,117,486 B2 * 10/2006 Wong .................... G06F 9/4862
717/141
7,251,637 B1 * 7/2007 Caid .................... G06K 9/4623
706/15

(Continued)

OTHER PUBLICATIONS

Ketki, S.K. et al. (May 2015). "A Novel Study for Summary/Attribute Based Bug Tracking Classification Using Latent Semantic Indexing and SVD in Data Mining," *International Journal of Advanced Technology in Engineering and Science*, vol. 3, No. 1; pp. 214-220.

(Continued)

*Primary Examiner* — Hanh B Thai
(74) *Attorney, Agent, or Firm* — Finnegan, Henderson, Farabow, Garrett & Dunner LLP

(57) ABSTRACT

Existing software defect text categorization approaches are based on use of supervised/semi-supervised machine learning techniques, which may require significant amount of labeled training data for each class in order to train the classifier model leading to significant amount of human effort, resulting in an expensive process. Embodiments of the present disclosure provide systems and methods for circumventing the problem of dependency on labeled training data and features derived from source code by performing concept based classification of software defect reports. In the present disclosure, semantic similarity between the defect category/type labels and the software defect report(s) is computed and represented in a concept space spanned by corpus of documents obtained from one or more knowledge bases, and distribution of similarity values are obtained. These similarity values are compared with a dynamically generated threshold, and based on the comparison, the software defect reports are classified into software defect categories.

15 Claims, 4 Drawing Sheets

(51) Int. Cl.
*G06F 16/93* (2019.01)
*G06F 16/35* (2019.01)
*G06F 40/30* (2020.01)
*G06F 40/289* (2020.01)
*G06K 9/62* (2006.01)

(52) U.S. Cl.
CPC ............ *G06F 40/289* (2020.01); *G06F 40/30* (2020.01); *G06K 9/628* (2013.01); *G06K 9/6224* (2013.01)

(58) Field of Classification Search
USPC .................................................. 707/608, 749
See application file for complete search history.

(56) References Cited

U.S. PATENT DOCUMENTS

| | | | | |
|---|---|---|---|---|
| 7,337,158 | B2* | 2/2008 | Fratkina | G06N 5/042 706/45 |
| 7,536,413 | B1* | 5/2009 | Mohan | G06F 16/355 |
| 7,539,656 | B2* | 5/2009 | Fratkina | G06N 5/042 706/45 |
| 8,756,234 | B1* | 6/2014 | Dreyer | G06F 19/00 707/739 |
| 9,244,510 | B1* | 1/2016 | Conrad | G06F 11/30 |
| 2005/0025357 | A1* | 2/2005 | Landwehr | A01M 1/026 382/170 |
| 2006/0294101 | A1* | 12/2006 | Wnek | G06F 16/93 |
| 2007/0203693 | A1* | 8/2007 | Estes | G06N 5/022 704/9 |
| 2011/0265099 | A1* | 10/2011 | Tobe | G06F 9/542 719/314 |
| 2012/0059776 | A1* | 3/2012 | Estes | G06N 5/022 706/11 |
| 2013/0124435 | A1* | 5/2013 | Estes | G06N 5/022 706/11 |
| 2014/0047544 | A1* | 2/2014 | Jakobsson | G06F 21/55 726/23 |
| 2016/0140236 | A1* | 5/2016 | Estes | G06N 5/022 707/709 |
| 2017/0091544 | A1* | 3/2017 | Adachi | G06K 9/6878 |
| 2017/0177308 | A1* | 6/2017 | Montagnon | G06F 8/35 |
| 2017/0177310 | A1* | 6/2017 | Mathias | G06F 8/36 |
| 2017/0235848 | A1* | 8/2017 | Van Dusen | G06Q 50/01 705/12 |
| 2018/0196799 | A1* | 7/2018 | Lecourt | G06F 16/353 |

OTHER PUBLICATIONS

Thomas, S.W. "Mining Software Repositories with Topic Models," *2011 33rd International Conference on Software Engineering (ICSE)*, Honolulu, Hawaii, May 21-28, 2011; pp. i-39.

Nguyen, A.T. et al. "Duplicate Bug Report Detection with a Combination of Information Retrieval and Topic Modeling," *2012 Proceedings of the 27th IEEE/ACM International Conference Proceeding ASE*, Essen, Germany, Sep. 3-7, 2012; pp. 70-79.

* cited by examiner

SYSTEMS AND METHODS FOR CLASSIFICATION OF SOFTWARE DEFECT REPORTS

PRIORITY CLAIM

This U.S. patent application claims priority under 35 U.S.C. § 119 to: India Application No. 201721013935, filed on Apr. 19, 2017. The entire contents of the aforementioned application are incorporated herein by reference.

TECHNICAL FIELD

The disclosure herein generally relates to software defect report analysis, and, more particularly, to systems and methods for classification of software defect reports.

BACKGROUND

A lot of important information is captured as text data in Software Development Life Cycle (SDLC). Software defect management is a vital part of maintenance and evolution phases of the SDLC. During the testing phase as well as real-life usage of software, many defects associated with various aspects of software are reported. Classifying these defects using techniques, for example, a suitable defect classification scheme (such as the Orthogonal Defect Classification (ODC)), IEEE standard 1044, and the like helps to streamline the defect management process and reap multiple benefits such as identifying patterns in the defect reports, faster root cause analysis and so on.

Textual description in a software defect (e.g., software bug) report is very important for understanding of the defect and its subsequent classification as per a given classification scheme. Automatic identification of the defect type from the textual defect description can significantly improve the defect analysis time and the overall defect management process. This has been recognized in the software repository mining research community and multiple solutions have been proposed over the past decade.

The standard data-driven approach such as supervised machine-learning for software defect type classification needs a significant amount of labeled training data to build a predictive model. This labeled dataset is typically created by humans with domain knowledge and expertise. This is clearly an effort-intensive as well as expensive activity. Further, existing approaches for software defect text categorization are based on use of the supervised or semi-supervised machine learning approaches. In the supervised learning approach, one needs a significant amount of labeled training data for each class in order to train the classifier model. The labeled training data consists of a large number of defects which have been manually annotated and validated for the defect type classification as per the applicable classification scheme. Generating this training data needs significant amount of human effort, leading to an expensive process and further uses the available expertise and resources inefficiently. The research community is aware of this challenge and has proposed use of active learning and semi-supervised learning for software defect classification which aim to reduce amount of labeled training data required and in-turn minimize the human annotation effort required. Even though these approaches improve upon the basic supervised learning approach, they still need reasonable human effort to produce the necessary amount of labeled training data to carry out the software defect classification. Additionally, these and other conventional techniques also use features derived from source code and obtained by pre-processing the code that fixes the bug.

SUMMARY

Embodiments of the present disclosure present technological improvements as solutions to one or more of the above-mentioned technical problems recognized by the inventors in conventional systems. In one aspect, there is provided a processor implemented method for classifying software defect reports into one or more software defects categories comprising: obtaining, by one or more hardware processors, input data comprising (a) one or more software defect reports; (b) one or more software defect categories, each software defect category from the one or more software defect categories comprising a class label and associated textual description thereof, and (c) a corpus of documents; segmenting, by the one or more hardware processors, input text of the one or more software defect reports into one or more segments based on the input data, each of the one or more segments comprises text content; performing analysis on the corpus of documents obtained from one or more knowledge bases to identify a subset of relevant documents from the corpus of documents; generating a concept space based on the identified subset of relevant documents; projecting into the concept-space, by the one or more hardware processors, text content of the one or more segments pertaining to at least one of the one or more software defect reports and the textual description of the one or more software defect categories to generate a concept-space representation for each of the one or more software defect reports and the one or more software defect categories; computing, by the one or more hardware processors, one or more similarities between the concept-space representation of each of the one or more software defect reports and each of the one or more software defect categories to obtain distribution of one or more similarity values specific to the one or more software defect reports to be classified; performing, by the one or more hardware processors, a comparison of distribution of the one or more similarity values with a dynamically generated threshold; and classifying by the one or more hardware processors, the one or more software defect reports into the one or more software defect categories based on the comparison. In an embodiment, when the one or more similarity values are higher than the dynamically generated threshold, the one or more software defect reports are classified into the one or more software defect categories. In an embodiment, the dynamically generated threshold is based on the distribution of the one or more similarity values.

In an embodiment, the step of performing analysis may comprise applying one or more document identification techniques on the corpus of documents obtained from the one or more knowledge bases to identify the subset of relevant documents. In an embodiment, the one or more document identification techniques comprises at least one of one or more graph-theoretic analysis, one or more keyword identification techniques and one or more text clustering techniques.

In another aspect, there is provided a system for classifying software defect reports into one or more software defects categories comprising: a memory storing instructions and one or more modules; one or more communication interfaces; and one or more hardware processors coupled to the memory via the one or more communication interfaces, wherein the one or more hardware processors are configured by the instructions to execute the one or more modules comprising: an input reader module that is configured to: obtain input data comprising (a) one or more software defect reports; (b) one or more software defect categories, each software defect category from the one or more software defect categories comprising a class label and associated textual description thereof, and (c) a corpus of documents; a software defect report text segmentation module that is configured segment input text of the one or more software defect reports into one or more segments based on the input data, each of the one or more segments comprises text content; a concept-space creation module that is configured to: perform analysis on the corpus of documents obtained from one or more knowledge bases to identify a subset of relevant documents from the corpus of documents; and generate a concept space based on the identified subset of relevant documents; a projection module that is configured to project into the concept-space, text content of the one or more segments pertaining to at least one of the one or more software defect reports and the textual description of the one or more software defect categories to generate a concept-space representation for each of the one or more software defect reports and the one or more software defect categories; a concept-space similarity computation module that is configured to compute one or more similarities between the concept-space representation of each of the one or more software defect reports and each of the one or more software defect categories to obtain distribution of one or more similarity values specific to the one or more software defect reports to be classified; and a software defect classification module that is configured to: perform a comparison of distribution of the one or more similarity values with a dynamically generated threshold, and classify the one or more software defect reports into the one or more software defect categories based on the comparison. In an embodiment, when the one or more similarity values are higher than the dynamically generated threshold, the one or more software defect reports are classified into the one or more software defect categories. In an embodiment, the dynamically generated threshold is based on the distribution of the one or more similarity values.

In an embodiment, the concept-space creation module performs the analysis by applying one or more document identification techniques on the one or more knowledge bases and the corpus of documents to identify the subset of relevant documents. In an embodiment, the one or more document identification techniques comprises at least one of one or more graph-theoretic analysis, one or more keyword identification techniques and one or more text clustering techniques.

In yet another aspect, there is provided one or more non-transitory machine readable information storage mediums comprising one or more instructions which when executed by one or more hardware processors causes obtaining, via the one or more hardware processors, input data comprising (a) one or more software defect reports; (b) one or more software defect categories, each software defect category from the one or more software defect categories comprising a class label and associated textual description thereof, and (c) a corpus of documents; segmenting, input text of the one or more software defect reports into one or more segments based on the input data, each of the one or more segments comprises text content; performing analysis on the corpus of documents obtained from one or more knowledge bases to identify a subset of relevant documents from the corpus of documents; generating a concept space based on the identified subset of relevant documents; projecting, into the concept-space, text content of the one or more segments pertaining to at least one of the one or more software defect reports and the textual description of the one or more software defect categories to generate a concept-space representation for each of the one or more software defect reports and the one or more software defect categories; computing one or more similarities between the concept-space representation of each of the one or more software defect reports and each of the one or more software defect categories to obtain distribution of one or more similarity values specific to the one or more software defect reports to be classified; performing a comparison of distribution of the one or more similarity values with a dynamically generated threshold; and classifying the one or more software defect reports into the one or more software defect categories based on the comparison. In an embodiment, when the one or more similarity values are higher than the dynamically generated threshold, the one or more software defect reports are classified into the one or more software defect categories. In an embodiment, the dynamically generated threshold is based on the distribution of the one or more similarity values.

In an embodiment, the step of performing analysis may comprise applying one or more document identification techniques on the corpus of documents obtained from the one or more knowledge bases to identify the subset of relevant documents. In an embodiment, the one or more document identification techniques comprises at least one of one or more graph-theoretic analysis, one or more keyword identification techniques and one or more text clustering techniques.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
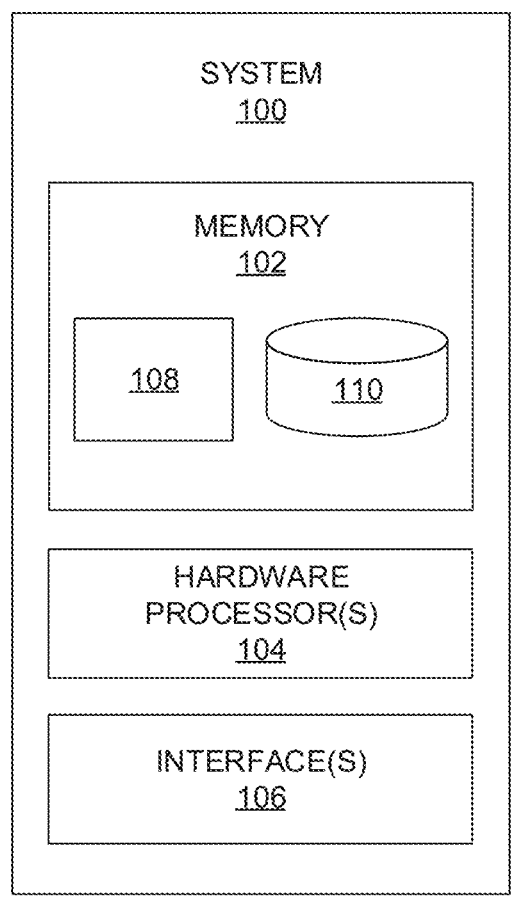
FIG. 1 illustrates an exemplary block diagram of a system for classification of software defect reports according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In an embodiment of the present disclosure, systems and methods for classification of software defect reports are disclosed. As described above, existing systems and methods rely on standard data-driven approach such as supervised machine-learning for software defect type classification that needs a significant amount of labeled training data to build a predictive model. This labeled dataset is typically created by humans with domain knowledge and expertise. This is clearly an effort-intensive as well as expensive activity. Further, existing approaches for software defect text categorization are based on use of the supervised or semi-supervised machine learning approaches. In the supervised learning approach, one needs a significant amount of labeled training data for each class in order to train the classifier model. The labeled training data consists of a large number of defects which have been manually annotated and validated for the defect type classification as per the applicable classification scheme. Generating this training data needs significant amount of human effort, leading to an expensive process and further uses the available expertise and resources inefficiently. The research community is aware of this challenge and has proposed use of active learning and semi-supervised learning for software defect classification which aim to reduce amount of labeled training data required and in-turn minimize the human annotation effort required. Even though these approaches improve upon the basic supervised learning approach, they still need reasonable human effort to produce the necessary amount of labeled training data to carry out the software defect classification.

Embodiments of the present disclosure provide systems and methods for classification of software defect reports and avoid the use of labeled training data thereby, achieve the automated classification of software defects using the "semantic" information inherent in the label descriptions. The embodiments of the present disclosure provide systems and methods for classification of software defect reports using keywords from the defect labels' textual descriptions in the defect classification schemes (such as ODC) and represent the labels using knowledge base articles as features. The embodiments assume that each knowledge base article corresponds to a human-interpretable concept wherein the vector space spanned by all knowledge base articles in the knowledge bases as the concept space. The embodiments of the present disclosure further enable systems and methods to apply one or more techniques, for example, concept-space representation to project the defect labels as well as individual defect descriptions in this concept space. Thus, unlike conventional or traditional systems and methods that use traditional bag-of-words features, the embodiments of the present disclosure represent the classification labels as well as the individual defects using this bag-of-concepts feature representation. Further the system of the present disclosure computes similarity between the defect labels and a defect description in the knowledge base concept space and then, assigns one or more defect labels depending on the distribution of similarity values, relative strength of similarity across different defect labels and number of common concepts between a defect label's concept-space representation and the defect report description's concept-space representation. This approach helps to circumvent the problem of dependence on labeled training data.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for classification of software defect reports according to an embodiment of the present disclosure. The system 100 may also referred as a classification system hereinafter. In an embodiment, the system 100 includes one or more processors 104, communication interface device(s) or input/output (I/O) interface(s) 106, and one or more data storage devices or memory 102 operatively coupled to the one or more processors 104. The memory 102 comprises one or more modules 108 and the database 110. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
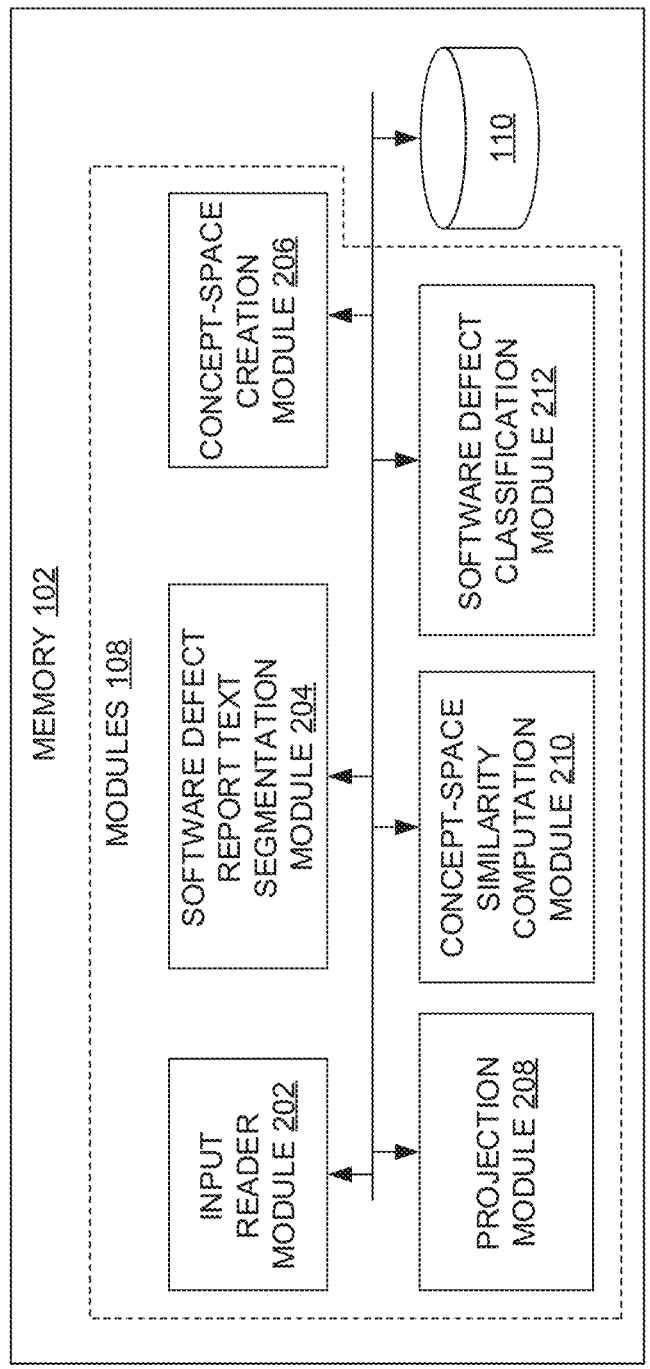
FIG. 2 is a block diagram of various modules stored in a memory of the system of FIG. 1 in accordance with an embodiment of the present disclosure.

FIG. 2, with reference to FIG. 1, is a block diagram of various modules 108 stored in the memory 102 of the system 100 of FIG. 1 in accordance with an embodiment of the present disclosure. In an embodiment of the present disclosure, the memory 102 comprises an input reader module 202, a software defect report text segmentation module 204, a concept-space creation module 206, a projection module 208, a concept-space similarity computation module 210, a software defect classification module 212, and the database 110. In an embodiment of the present disclosure, the input reader module 202, the software defect report text segmentation module 204, the concept-space creation module 206, the projection module 208, the concept-space similarity computation module 210, the software defect classification module 212 are implemented as at least one of a logically self-contained part of a software program, a self-contained hardware component, and/or, a self-contained hardware component with a logically self-contained part of a software program embedded into each of the hardware component that when executed perform the above method described herein.

Figure 3:
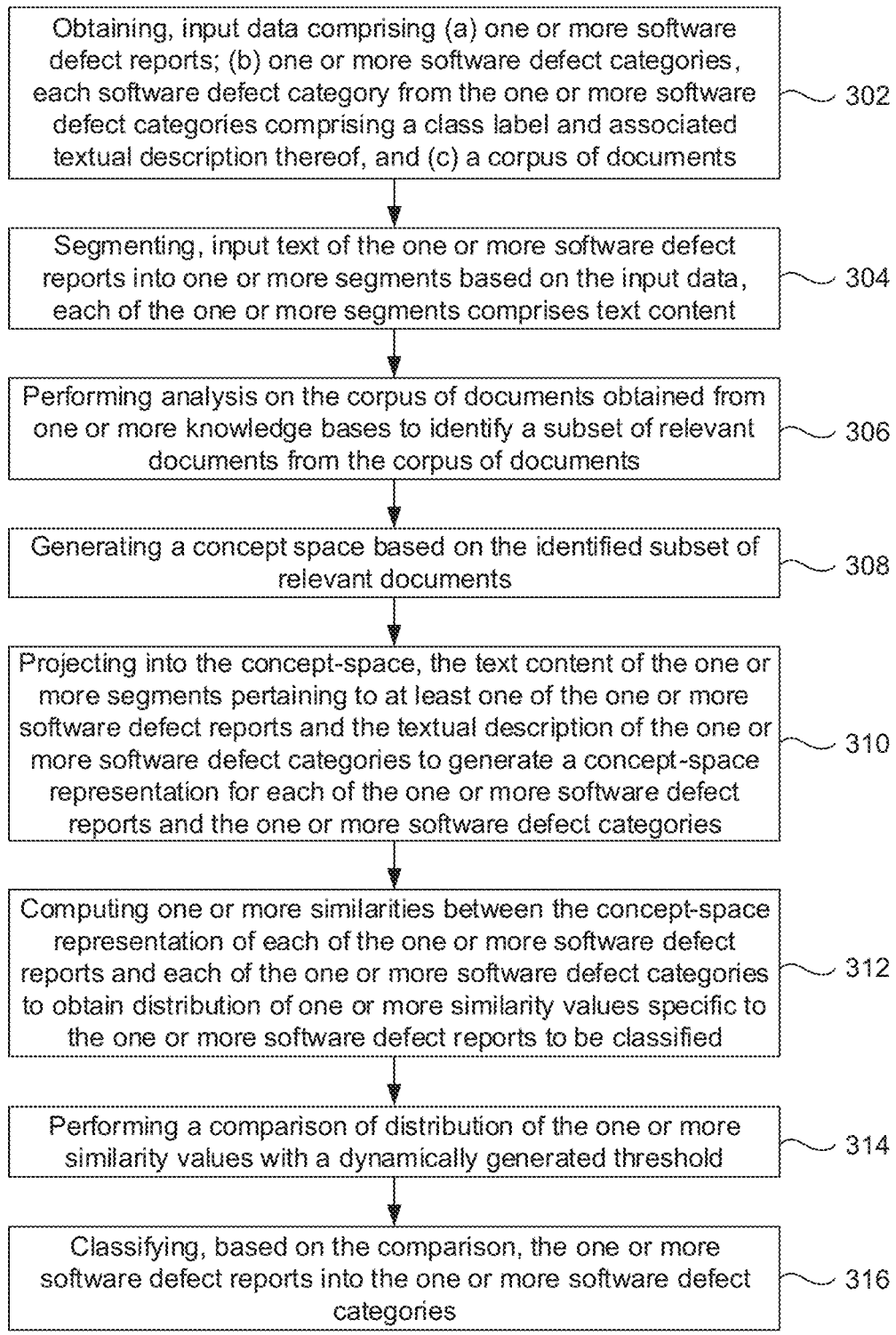
FIG. 3 is an exemplary flow diagram illustrating a method for classification of software defect reports using the system of FIG. 1 according to an embodiment of the present disclosure.

FIG. 3, with reference to FIGS. 1-2, is an exemplary flow diagram illustrating a method for classification of software defect reports using the system 100 of FIG. 1 according to an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 and the modules 202-212 as depicted in FIGS. 1-2, and the flow diagram. In an embodiment of the present disclosure, at step 302, the input reader module 202, when executed by the one or more hardware processors 104, obtains input data comprising (a) one or more software defect reports to be classified; (b) one or more software defect categories, each software defect category from the one or more software defect categories comprising a class label and associated textual description thereof, and (c) a corpus of documents. In an embodiment, the corpus of documents may be obtained from one or more knowledge bases (e.g., Wikipedia®, and the like). In an embodiment of the present disclosure, the one or more class labels along with textual description of the one or more software defect categories comprise keyword(s) or phrase(s) describing each category briefly. In an embodiment, the one or more software defect categories may be obtained from an existing defect classification scheme such as the Orthogonal Defect Classification (ODC) scheme, the IEEE 1044 defect classification scheme or a custom-made defect classification scheme. In an embodiment of the present disclosure, the corpus of documents comprise documents that may correspond to a concept grounded in human cognition. In an embodiment, the one or more software defect reports to be classified, one or more class labels along with textual description of one or more software defect categories may be stored in the database 110. The corpus of documents obtained from one or more knowledge bases may also be stored (comprised) in the database 110.

In an embodiment of the present disclosure, at step 304, the software defect report text segmentation module 204 when executed by the one or more hardware processors 104 segments input text of the one or more software defect reports into one or more segments based on the input data received at step 302, wherein each of the one or more segments comprises corresponding text content. In an embodiment, a software defect report contains textual description that gives details about the occurrence of software defect. In many of the software defect reports, the textual description contains details such as "Software version", "Name of the software testing person", "Operating System version", "Summary of the software defect", "Steps to reproduce the defect", "Expected result", "Actual Result", "Detailed description of the software defect" and additional details about the software defect. When a software defect report has been structured with details available in this format, the software defect report text segmentation module 204 segments the input text of the software defect into the different fields as outlined above (e.g., "Software version", "Name of the software testing person", "Operating System version", "Summary of the software defect", "Steps to reproduce", "Expected result", "Actual Result", "Detailed description of the software defect" and so on). For better understanding of the embodiments of the present disclosure for classification of the software defect reports, the system 100 may obtain text content from only some of these segments which are deemed as more important for classification purpose, for example, "Summary of the software defect", "Steps to reproduce", "Expected result", "Actual Result", and "Detailed description of the software defect". If there is no clear demarcation of such segments, entire text content of the one or more software defect reports may be considered as a single "Detailed description of the software defect" segment by the system 100.

In an embodiment of the present disclosure, at step 306, the concept-space creation module 206 when executed by the one or more hardware processors 104 performs analysis on the corpus of documents obtained from one or more knowledge bases to identify a subset of relevant documents from the corpus of documents. In an embodiment, the step of performing analysis comprises applying one or more document identification techniques on the corpus of documents obtained from the one or more knowledge bases to identify the subset of relevant documents. For better understanding of the embodiments of the present disclosure for classification of the software defect reports, the system 100 or the concept-space creation module 206 ensures that the at least a subset of documents are related to concepts from at least one of a software development life cycle, software development and testing technologies as well as about concepts and information related to a domain for which the software application is being developed. In an embodiment of the present disclosure, the system may employ general purpose encyclopedic knowledge-bases such as Wikipedia® as they do contain informative articles about software development life cycle, software technologies as well as many other domains. It is to be noted that the general purpose knowledge-bases also tend to contain a large fraction of documents which may be irrelevant for the purpose of software defect classification. Hence, the concept space creation module 206 identifies and selects a subset of documents (e.g., the at least a subset of documents or the subset of relevant documents) from the corpus of documents which are more likely to be relevant for the purpose of software defect classification and filter out the remaining documents from the corpus. In order to identify and select the at least a subset of documents, the system 100 of the concept space creation module 206 applies one or more document identification techniques on the one or more knowledge bases and the corpus of documents to identify the subset of relevant documents. For instance, the one or more document identification techniques comprises at least one of one or more graph-theoretic analysis, one or more keyword identification techniques, one or more text clustering techniques, combinations thereof, that are applied on the knowledge bases or the corpus of documents (fed as input). The one or more graph-theoretic analysis, one or more keyword identification techniques, one or more text clustering techniques, etc. may be stored in the memory 102 and queried for execution to identify the subset of relevant documents. These identified and/or selected subset of documents are pre-processed and a concept-space is created by mapping n-grams (sequence of tokens of length 'n') to the at least a subset of relevant documents from at least one of the corpus of documents obtained from one or more knowledge bases. In an embodiment of the present disclosure, 'n' in the n-gram can be a user-specified parameter which can take values from 1 to a user-specified maximum value (e.g., a maximum value of 3).

In an embodiment of the present disclosure, at step 308, the concept-space creation module 206 when executed by the one or more hardware processors 104 generates a concept space based on the subset of relevant documents identified in step 306.

In an embodiment of the present disclosure, at step 310, the projection module 208 when executed by the one or more hardware processors 104 projects, into the concept-space (or the created concept-space), text content of the one or more segments pertaining to at least one of the one or more software defect reports and the textual description of the one or more software defect categories to generate a concept-space representation. In other words, text content pertaining to the one or more segments specific to at least one of the one or more software defect reports and the textual description of the one or more software defect categories are projected into the concept-space (generated in step 308) for each of the one or more software defect reports and the one or more software defect categories. For instance, the projection module 208 projects text data (or text content) of the one or more segments pertaining to the one or more software defect reports such as "Summary of the software defect", "Steps to Reproduce", "Expected result", "Actual Result", and "Detailed description of the software defect" as obtained from the software defect report text segmentation module 204 as well as the textual description of the one or more software defect categories into the concept-space created by the concept-space creation module 206 and the concept-space representation of the software defect report(s) as well the software defect categories is generated.

In an embodiment of the present disclosure, at step 312, the concept-space similarity computation module 210 when executed by the one or more hardware processors 104 computes, one or more similarities between the concept-space representation of each of the one or more software defect reports and each of the one or more software defect categories to obtain distribution of one or more similarity values specific to the one or more software defect reports to be classified.

In an embodiment of the present disclosure, at step 314, the classification module 210 when executed by the one or more hardware processors 104 performs a comparison of distribution of the one or more similarity values with a threshold, and classifies the one or more software defect reports into the one or more software defect categories based on the comparison, at step 316. In an embodiment of the present disclosure, the threshold is either predefined or dynamically generated. The threshold when dynamically generated is (or may be) based on the distribution of the one or more similarity values. Additionally, the threshold may be subject to a constraint on minimum number of common concepts in the concept-space representations of each of one or more software defect reports and the one or more software defect categories, in one example embodiment. In an embodiment of the present disclosure, the classification module 212 takes the distribution of the one or more similarity values computed as input and then sorts this distribution of the one or more similarity values to identify a similarity threshold value. In an embodiment of the present disclosure, when the one or more similarity values are higher than (or equal to) the threshold, the one or more software defect reports are classified into the one or more software defect categories (e.g., a first set of software defect categories). In other words, when the one or more similarity values are higher than (or equal to) the threshold, one of more software defects from the software defect reports are classified into the first set of software defect categories. Similarly, when the one or more similarity values are lesser than the threshold the class labels (or the one or more software defect categories) are not assigned to the one or more software defect reports. In other words, those software defect categories having corresponding similarity value less than the threshold are not assigned to the software defect report(s). In one embodiment, the expressions 'class label', 'defect type', 'defect type label', and 'defect label' can be interchangeably used hereinafter.

The concept space is spanned by the articles (or corpus of documents) in knowledge base (e.g., Wikipedia®). A concept $c_j$ in concept-space representation corresponds to a knowledge base article (e.g., Wikipedia® article) and is represented using a TF-IDF like weighted vector of words in that article. An inverted index is prepared which helps in mapping one or more words to a list of concepts in which it appears. Word-to-concepts association in this inverted index are weighted by a TF-IDF like term weighing scheme (e.g., BM25 weighing scheme). Relatively low weight entries in this inverted index are filtered as noise. Given a software defect report D, it is first represented as a term-vector using bag of words (e.g., wherein every word is a dimension) scheme/space weighted by TF-IDF like term weighing scheme (e.g., BM25 weighing scheme). Using the inverted index, the concept vectors for each term $w_d \in D$ are merged to form the weighted vector of concepts representing the given software defect report D.

Below is an illustrative implementation of the embodiments of the present disclosure by way of an example:

Following are exemplary notations to describe technique (s) or method(s) implemented by the embodiments of the present disclosure:

D={$w_d$} set of words in the input text data of a software defect report.

L={$w_i$} set of words in the input text data of a defect label (or software defect category).

N=number of knowledge base concepts used in concept-space representation (ordered by decreasing strength of association).

Let $\vec{V}_D$ denote concept-space representation vector of length N for the defect report D; i.e., $$\vec{V}_D = [p_1, \ldots, p_N]^T$$

An entry $p_j$ of $\vec{V}_D$ denotes weight of corresponding concept $c_j$ in concept-space representation of D. The entry $p_j$ is computed as below:

$$p_j = \sum_{w_i \in D} v_i \cdot k_{ij}$$

where $v_i$ is the BM25 weight of word $w_i$ in the TF-IDF-like weighted vector representation of D, wherein BM25 is an advanced variation of the TF-IDF term weighing scheme (ref: Stephen Robertson & Hugo Zaragoza (2009). "The Probabilistic Relevance Framework: BM25 and Beyond". 3 (4). Found. Trends Inf. Retr.: 333-389. DOI: 10.1561/1500000019); and $k_{ij}$ quantifies the strength of association of word $w_i$ with knowledge-base concept $c_j$ in the inverted index.

Similarly, let $\vec{V}_L$ denote concept-space representation vector of length N for the defect type label L; i.e., $$\vec{V}_L = [q_1, \ldots, q_N]^T$$

An entry $q_j$ of $\vec{V_L}$ denotes weight of corresponding concept $c_j$ in concept-space representation of L. The entry $q_j$ is computed as below:

$$q_j = \sum_{w_i \in L} v_i \cdot k_{ij}$$

Where:
$v_i$ is the BM25 weight of word $w_i$ in the TF-IDF-like weighted vector representation of L; and
$k_{ij}$ quantifies the strength of association of word $w_i$ with knowledge-base concept
$c_j$ in the inverted index.

A software defect report D is represented using a vector $\vec{V_D}$ of knowledge base (e.g., Wikipedia®) articles. Each defect type label (or software defect category) is also represented using a corresponding concept-space representation vector $\vec{V_L}$.

Entries of $\vec{V_D}$ (similarly, $\vec{V_L}$) reflect the relevance of the corresponding concepts to the input software defect report D (similarly, L). To compute semantic relatedness of a defect type label L, and the software defect report D, their concept-space representation vectors are compared using the following cosine metric provided by way of example:

$$sim(\vec{V_D}, \vec{V_L}) = \frac{\vec{V_D} \cdot \vec{V_L}}{\|\vec{V_D}\| \cdot \|\vec{V_L}\|} \quad (1)$$

For the final classification, the software defect report is assigned one or more defect labels depending on the distribution of similarity values, relative strength of similarity across different defect labels and number of common concepts between a defect label's concept-space representation and the defect report description's concept-space representation.

Embodiments of the present disclosure, and systems and method associated thereof provide an illustrative classification of software defect reports into one or more categories, by way of example below:

As mentioned above, at step 302, the system 100 receives an input comprising software defect report(s), one or more software defect categories, each software defect category comprising a class label and associated textual description thereof, a corpus of documents obtained from one or more knowledge-bases as depicted below. For sake of brevity and better understanding of the embodiments of the present disclosure, a sample defect classification scheme consisting of 3 defect types along with textual description of each defect type is provided below:

Control and data flow defect type: This defect type is applicable for software defects related to algorithm; errors or exceptions due to variable assignment or initialization; checking conditional statements and for/while loops; timing, serialization or synchronization in multi-thread or multi-process systems, etc.

Structural defect type: This is applicable to defects in interface between software modules or components, application programming interface (API), object oriented design including classes, objects; relationships among procedures, database schema, entity relationship diagram(s), etc.

Non-code defect type: This defect type is applicable for defects in software documentation such as manuals, user guides, javadoc; software build process; software configuration and installation; software configuration and change management process; software graphical user interface or navigation, etc.

In the above defect types, Control and data flow defect type, Structural defect type, and Non-code defect type are class labels, wherein text comprising "This defect type is applicable for software defects related to algorithm; errors or exceptions due to variable assignment or initialization; checking conditional statements and for/while loops; timing, serialization or synchronization in multi-thread or multi-process systems, etc." is a sample textual description of a software defect category. Similarly, remaining of the class labels, Structural defect type, and Non-code defect type comprise textual description as depicted above.

Further, a sample software defect report is considered:
Bug Title: FPtree nodes multiply-added (becoming siblings in tree)
Bug Details:
Created: 14/Nov/11
Version: 0.6
Priority: Major
Reporter: Abc Xyz
OS: Linux
In FPGrowth # traverseAndBuildConditionalFPTreeData, while creating a conditional FPtree sometimes nodes are multiply-added as children of the same node, becoming siblings in the conditional tree.

As mentioned in step 304, the system 100 via the software defect report text segmentation module 204 performs segmentation of the above sample defect report in to different segments using regular expressions to extract parts of each segment, in an example embodiment. Below illustrated is an example of one or more segments obtained from segmentation process by the system 100, provided by way of example table 1:

TABLE 1

| Defect Segment | Content of the Defect Segment (for the sample defect report) |
| --- | --- |
| Defect Title | FPtree nodes multiply-added (becoming siblings in tree) |
| Defect Report Date | 14/Nov/11 |
| Defect Reporter | Abc Xyz |
| Defect Priority | Major |
| Defect Miscellaneous Information | Version: 0.6. OS: Linux. |
| Steps to Reproduce | <Not available> |
| Expected Result | <Not available> |
| Actual Result | <Not available> |
| Defect Detailed Description | In FPGrowth#traverseAndBuildConditionalFPTreeData, while creating a conditional FPtree sometimes nodes are multiply-added as children of the same node, becoming siblings in the conditional tree. |

Once the segmentation step is complete, the system 100 considers text content of the defect segments: "Defect Title", "Steps to reproduce", "Expected Result", "Actual Result", and "Defect detailed description" for the purpose of defect classification. Content of other defect report segments may be disregarded for the purpose of defect classification.

Text content of the defect segments, "Defect Title", "Steps to reproduce", "Expected Result", "Actual Result", and "Defect detailed description", is combined into a single text string denoted by "Defect_Text_for_Classification" and this text string is then projected in the concept space. For the ongoing example, the "Defect_Text_for_Classification" is obtained as segmentation output:

"FPtree nodes multiply-added (becoming siblings in tree). In FPGrowth # traverseAndBuildConditionalFPTreeData, while creating a conditional FPtree sometimes nodes are multiply-added as children of the same node, becoming siblings in the conditional tree."

As a next step, the system 100 performs (an) analysis on the corpus of documents obtained from one or more knowledge bases to identify a subset of relevant documents from the corpus of documents. It is to be understood to a person having ordinary skill in the art or person skilled in the art that the step of analyzing knowledge bases and identifying a subset of relevant documents may not be required to be repeated for every software defect report under consideration for software defect report classification task. Moreover, this could typically be a pre-processing activity that may be carried out before the actual task of classification of given set of software defect reports, in one example embodiment. Specifically step 306 is discussed herein:

Identification of suitable set of relevant documents for concept-space creation:

The system 100 utilizes, for example, English Wikipedia® as the corpus of documents corresponding to knowledge base. The Wikipedia® has approximately 3.5 million documents. Since Wikipedia® is a general-purpose corpus, using the entire Wikipedia® to create concept-space for the task of software defect classification tends to include many irrelevant documents. Hence, the embodiments employ proposed method(s) of the present disclosure to identify a subset of Wikipedia® documents, which are more likely to be relevant for the task of software defect classification (which is the objective of the present disclosure). A graph of Wikipedia® documents (not shown in FIGS.) using hyperlinks connecting different Wikipedia® documents is generated. A (small) set of Wikipedia® documents are used as seed documents for the task of software defect report classification. These seed documents are configurable parameters for the task of software defect report classification. User(s) may update the seed documents only when he/she wants to adapt the proposed system and/or method for classification software defects in a new application, a new technology or a new domain which is not covered in existing set of seed documents. The system 100 identifies the subset of Wikipedia® documents, which are reachable within 'x' hops (e.g., in the present experimental scenario—3 hops) from these "seed documents", in an example embodiment. To identify this subset of Wikipedia® documents, the system 100 executes a breadth-first-search (BFS) on the Wikipedia® graph constructed using the hyperlinks. The breadth-first-search is type of a graph theory analysis implemented and executed by the system 100 to identify relevant set of documents that are reachable within the 3 hops, in an example embodiment. In an embodiment, a first hop is referred as one or more neighbors (e.g., a first set of neighbors) of a seed node (or a seed document), a second hop is referred as one or more neighbors (e.g., a second set of neighbors) of the first set of neighbors, and a third hop is referred as one or more neighbors (e.g., a third set of neighbors) of the second set of neighbors.

For the current example and for sake of brevity, "Software bug" is used as the only seed document and only those Wikipedia® documents that are reachable within 3 hops from this seed document are identified as relevant set of documents (or referred as subset of documents) and included thereof. Using this subset of documents, a concept-space for required for concept-based classification of software defects is created. The concept-space is not shown in FIGS due to large set of documents being identified in the process. However, it is to be understood by person having ordinary skill in the art and person skilled in the art that implementing 3 hops (as implemented herein above) shall not be construed as limiting the scope of the present disclosure to identify relevant set of documents for software defect report classification.

Upon identifying the set of relevant documents, as mentioned in step 308, a concept-space is generated based on the identified set of relevant documents (not shown in FIGS due to constraints involved in concept-space generation including large corpus of documents).

Further, a concept-space representation for each of the software defect report (e.g., bug report as depicted in above working example), and the one or more software defect categories is obtained/generated as per step 310 of FIG. 3. A concept-space representation for each of the software defect report, and the one or more software defect categories is provided by way of illustrative example.

Exemplary concept-space representation for software defect report under consideration (e.g., "Defect_Text_for_Classification") depicted as output in step 304 (e.g., segmentation) is shown below table 2:

TABLE 2

| Concept-name | Concept-weight ($p_j$) |
| --- | --- |
| B-tree | 240.3415 |
| Tree structure | 218.1758 |
| Binary tree | 208.972 |
| Tree (data structure) | 208.3467 |
| Method of conditional probabilities | 201.5613 |
| B+ tree | 198.6778 |
| 2-3-4 tree | 195.4323 |
| Red-black tree | 194.8714 |
| Binary search tree | 190.172 |
| K-d tree | 189.7104 |
| R-tree | 184.4945 |
| Decision tree | 183.5046 |
| Merkle tree | 181.4268 |
| K-ary tree | 179.8803 |
| XPath 2.0 | 179.3442 |
| Unrooted binary tree | 176.2958 |
| Splay tree | 176.1109 |
| Influence diagram | 176.0226 |
| Decision tree learning | 175.3195 |
| Tree traversal | 174.0878 |
| AA tree | 172.5349 |
| Search tree | 171.5375 |
| Minimum spanning tree | 171.1333 |
| Tango tree | 170.4711 |
| Radix tree | 170.3283 |

As can be seen above, for the sake of brevity, only 25 concepts are shown. However, it is to be understood by person having ordinary skill in the art and person skilled in the art that 25 concepts as shown for the software defect report under consideration shall not be construed as limiting the scope of the present disclosure.

Similarly, exemplary concept-space representation for one or more software defect categories (or corresponding class label) under consideration (e.g., "control-and-dataflow") depicted as input in step 302 (e.g., class label and textual description) is shown below table 3:

TABLE 3

| Concept-name | Concept-weight ($q_j$) |
|---|---|
| Method of conditional probabilities | 100.2794 |
| Algorithm | 88.47162 |
| Conditional random field | 86.94427 |
| Data-flow analysis | 86.40695 |
| Conditional (computer programming) | 82.36719 |
| Expectation-maximization algorithm | 80.70309 |
| Missing data | 77.75474 |
| Persistent data structure | 77.39967 |
| Frank-Wolfe algorithm | 77.37742 |
| Group method of data handling | 77.35878 |
| Randomized algorithm | 75.98363 |
| Return statement | 74.68713 |
| Data structure | 74.37129 |
| Heap (data structure) | 74.09745 |
| Gauss-Newton algorithm | 73.84975 |
| Algorithm characterizations | 73.46178 |
| Non-blocking algorithm | 72.7425 |
| MAD (programming language) | 72.35045 |
| DPLL algorithm | 71.99201 |
| Switch statement | 71.26504 |
| Disjoint-set data structure | 70.78295 |
| Binary search algorithm | 70.54414 |
| Run-time algorithm specialisation | 70.20453 |
| Kruskal's algorithm | 70.02463 |
| Sorting algorithm | 69.47437 |

As can be seen above, for the sake of brevity, only 25 concepts are shown. However, it is to be understood by person having ordinary skill in the art and person skilled in the art that 25 concepts as shown for the software defect category (or software defect categories) under consideration shall not be construed as limiting the scope of the present disclosure.

Figure 4:
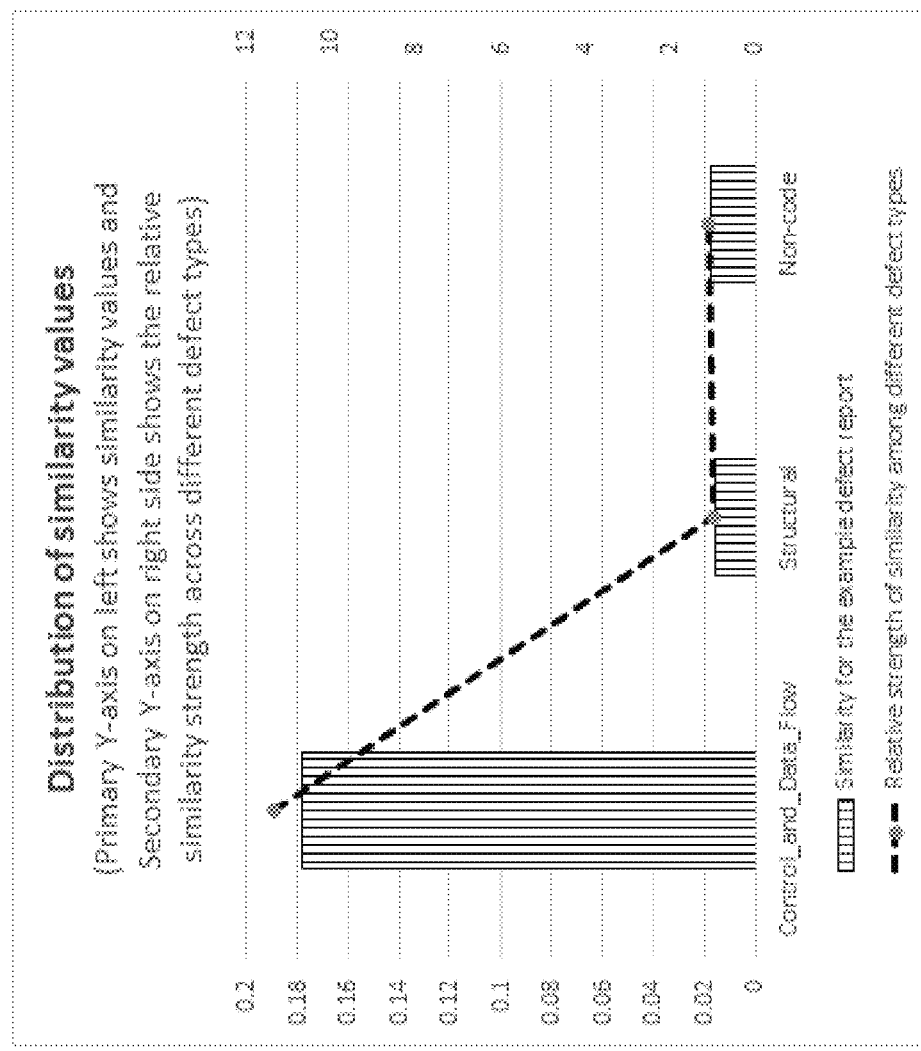
FIG. 4 illustrates a graphical representation depicting distribution of similarity values computed for each software defect category for software defect report under consideration in accordance with an embodiment of the present disclosure.

Upon generating a concept-space representation for each of the software defect reports and the software defect categories at step 312, the system 100 computes number of common concepts as well as similarity between the defect report and each of the defect label (and/or software defect categories). To assign a defect label (or herein also referred as class label of the one or more software defect categories), the system 100 take into account the distribution of similarity values, relative strength of similarity across different defect types (as shown in FIG. 4), subject to the constraint that at least 10% of number of concepts used in the concepts-space representations should be common between the software defect report and the defect label (or software defect categories). The system 100 computes average and standard deviation of similarity values corresponding to the defect labels (or software defect categories), which have less than 10% of number of concepts common with the concept-space representation of the one or more software defect reports. In an embodiment of the present disclosure, the standard deviation of similarity values is computed using a standard deviation formula known in the art. The system 100 then computes (generates) a threshold as the sum of the above computed average and 'n' times (e.g., in this example 'n' is 3) the above computed standard deviation of the set of similarity values corresponding to the defect labels (or software defect categories) having less than 10% of number of common concepts. The system 100 assigns the one or more defect labels (or software defect categories), whose concept-space representation has at least 10% of concepts common with the concept-space representation of the software defect report and whose similarity value is higher (greater) than (or equal to) the computed (generated) threshold.

If there is only one defect label (or software defect category), whose concept-space representation has less than 10% of concepts common with the concept-space representation of the software defect report, then the system 100 computes the threshold as 'p' times (e.g., in this example 'p' is say, 2) the similarity value corresponding to the only one defect label.

If there is no defect label (or software defect category), whose concept-space representation has less than 10% of concepts common with the concept-space representation of the software defect report (that is, all the defect labels (or software defect categories) have at least 10% of concepts common with the concept-space representation of the software defect report), then the system 100 computes the threshold based on the standard deviation and average of the similarity values corresponding to all defect labels. For instance, the system 100 computes the threshold by subtracting 'm' times (e.g., in this example, 'm' is say 3) the standard deviation of the similarity values corresponding to all defect labels from the average of the similarity values corresponding to all defect labels.

Below is an illustrative table (e.g., Table 4) depicting computation of similarity values and distribution thereof pertaining to each of the software defect reports (e.g., software defect report under consideration—"Defect_Text_for_Classification") and software defect categories (e.g., Control and Data Flow, Structural and Non-code). For the ongoing example, the distribution of similarity value, the relative strengths and number of common concepts are shown in the below table 4:

TABLE 4

| Defect-Type (Software defect category) | Similarity for the example defect report | Relative strength of similarity among different defect types | Number of common concepts between concept-space representation of Defect report and Defect label |
|---|---|---|---|
| Control and Data Flow | 0.1786 | 11.376 | 79 |
| Structural | 0.0157 | 1 | 10 |
| Non-code | 0.0174 | 1.108 | 10 |

As can be seen, for the defect report under consideration (e.g., Defect_Text_for_Classification), for each software defect category, column 2 depicts a similarity value. The similarity value for these is computed using the expression (1) described above. In an example embodiment, a similarity value of 0.1786 was computed for software defect category type "Control and Data Flow". Similarly, a similarity value of 0.0157 was computed for software defect category type "Structural", and a similarity value of 0.0174 was computed for software defect category type "Non-code". Column 3 represents relative strength of similarity among different defect categories (or types), wherein least value among the values from column 2 is different to determine the relative strength for each software defect category. In an example scenario, 0.0157 is the least similarity value identified which is used to divide the similarity value 0.1786 to compute a relative strength of similarity for software defect category type "Control and Data Flow", which in this case would be 11.376. Similarly, 0.0157 is the least similarity value identified which is used to divide the similarity value 0.0157 to compute a relative strength of similarity for software defect category type "Structural", which in this case would be 1 as can be seen in above Table 4. Similarly, 0.0157 is the least similarity value identified which is used to divide the similarity value 0.0174 to compute a relative strength of similarity for software defect category type "Non-code", which in this case would be 1.108. In the experimental results conducted, in reality there were 500 concepts considered for each of the software defect report under consideration and the one or more software defect categories. Column 4, represents number of common concepts between software defect report under consideration (e.g., Defect_Text_for_Classification) and categories (e.g., Control and Data Flow, Structural, and Non-code). As can be seen in above Table 4, there were 79 concepts in common found between the concepts pertaining to the software defect report under consideration—Defect_Text_for_Classification and Control and Data Flow defect category. Similarly, there were 10 software defect report under consideration—Defect_Text_for_Classification and Structural defect category. Likewise, there were 10 software defect report under consideration—Defect_Text_for_Classification and Non-code defect category. Based on the above table 4, FIG. 4, with reference to FIGS. 1 through 3, illustrates a graphical representation depicting distribution of similarity values computed for each software defect category for software defect report under consideration in accordance with an embodiment of the present disclosure. More specifically, the graphical representation is generated by the system 100 wherein Y-axis on the left side depicts "similarity values", computed using expression (1)) and Y-axis on right side depicts the relative similarity strength across different defect types (depicted by dotted line in FIG. 4).

Based on the experimental conduct, it was noted that the system 100 needed at least 50 concepts to be common between the concept-space representation of software defect report under consideration (e.g., Defect_Text_for_Classification) and categories (e.g., Control and Data Flow, Structural, and Non-code) to compute similarity values for each of the categories. 50 common concepts out of 500 is at least 10% which is the constraint in this scenario. The system 100 computes the threshold based on the average (e.g., average is computed for similarity values of the software defect categories that are having less than 10% of common concept of software defect report(s) representation) and 'n' times the standard deviation wherein 'n' in this case is 3. Therefore, the threshold is computed by way of following illustrative expression below:

$$\text{Average} = 0.01655 = ((0.0157 + 0.0174)/2)$$

$$\text{Standard deviation (or } stdev) = 0.001202082$$

$$\text{threshold} = \text{average} + 3 * stdev$$
$$= 0.01655 + 3 * 0.001202082$$
$$= 0.020156245$$

Each of the value from either column 2 is then compared with this dynamically generated similarity threshold, which in this case is 0.020156245.

In an example embodiment, similarity value pertaining to software defect category "Control and Data Flow" (e.g., 0.1786) was compared with 0.020156245. Similarly, similarity value pertaining to software defect category "Structural" (e.g., 0.0157) was compared with 0.020156245. Likewise, similarity value pertaining to software defect category "Non-code" (e.g., 0.0174) was compared with 0.020156245. As can be seen that similarity value associated with pertaining to software defect category "Control and Data Flow" (e.g., 0.1786) is higher (or greater) than the dynamically generated similarity threshold (e.g., 0.020156245). Therefore, the software defect report under consideration has been classified under (or into) "Control and data flow" software defect category as depicted in step 316.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having,"

"containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
    obtaining, by one or more hardware processors, input data comprising (a) one or more software defect reports; (b) one or more software defect categories, each software defect category from the one or more software defect categories comprising a class label and associated textual description thereof, and (c) a corpus of documents (302);
    segmenting, by the one or more hardware processors, input text of the one or more software defect reports into one or more segments based on the input data, each of the one or more segments comprises text content (304);
    performing analysis on the corpus of documents obtained from one or more knowledge bases to identify a subset of relevant documents from the corpus of documents (306);
    generating a concept space based on the identified subset of relevant documents (308);
    projecting into the concept-space, by the one or more hardware processors, text content of the one or more segments pertaining to at least one of the one or more software defect reports and the textual description of the one or more software defect categories to generate a concept-space representation for each of the one or more software defect reports and the one or more software defect categories (310);
    computing, by the one or more hardware processors, one or more similarities between the concept-space representation of each of the one or more software defect reports and each of the one or more software defect categories to obtain distribution of one or more similarity values specific to the one or more software defect reports to be classified (312);
    performing, by the one or more hardware processors, a comparison of distribution of the one or more similarity values with a dynamically generated threshold (314); and
    classifying by the one or more hardware processors, the one or more software defect reports into the one or more software defect categories based on the comparison (316).

2. The processor implemented method as claimed in claim 1, wherein the step of performing analysis comprises applying one or more document identification techniques on the corpus of documents obtained from the one or more knowledge bases to identify the subset of relevant documents.

3. The processor implemented method as claimed in claim 2, wherein the one or more document identification techniques comprises at least one of one or more graph-theoretic analysis, one or more keyword identification techniques and one or more text clustering techniques.

4. The processor implemented method as claimed in claim 1, wherein when the one or more similarity values are higher than the dynamically generated threshold, the one or more software defect reports are classified into the one or more software defect categories.

5. The processor implemented method as claimed in claim 1, wherein the dynamically generated threshold is based on the distribution of the one or more similarity values.

6. A system (100) comprising:
    a memory (102) storing instructions and one or more modules (108);
    one or more communication interfaces (106); and
    one or more hardware processors (104) coupled to the memory (102) via the one or more communication interfaces (106), wherein the one or more hardware processors (104) are configured by the instructions to execute the one or more modules (108) comprising:
        an input reader module (202) that is configured to: obtain input data comprising (a) one or more software defect reports; (b) each software defect category from the one or more software defect categories comprising a class label and associated textual description thereof, and (c) a corpus of documents;
        a software defect report text segmentation module (204) that is configured segment input text of the one or more software defect reports into one or more segments based on the input data, each of the one or more segments comprises text content;
        a concept-space creation module (206) that is configured to:
            perform analysis on the corpus of documents obtained from one or more knowledge bases to identify a subset of relevant documents from the corpus of documents, and
            generate a concept space based on the identified subset of relevant documents;
        a projection module (208) that is configured to project into the concept-space, text content of the one or more segments pertaining to at least one of the one or more software defect reports and the textual description of the one or more software defect categories to generate a concept-space representation for each of the one or more software defect reports and the one or more software defect categories;
        a concept-space similarity computation module (210) that is configured to compute one or more similarities between the concept-space representation of each of the one or more software defect reports and each of the one or more software defect categories to obtain distribution of one or more similarity values specific to the one or more software defect reports to be classified; and a software defect classification module (212) that is configured to:
perform a comparison of distribution of the one or more similarity values with a dynamically generated threshold, and
classify the one or more software defect reports into the one or more software defect categories based on the comparison.

7. The system as claimed in claim 6, wherein the concept-space creation module (206) performs the analysis by applying one or more document identification techniques on the corpus of documents obtained from the one or more knowledge bases to identify the subset of relevant documents.

8. The system as claimed in claim 7, wherein the one or more document identification techniques comprises at least one of one or more graph-theoretic analysis, one or more keyword identification techniques and one or more text clustering techniques.

9. The system as claimed in claim 6, wherein when the one or more similarity values are higher than the dynamically generated threshold, the one or more software defect reports are classified into the one or more software defect categories.

10. The system as claimed in claim 6, wherein the dynamically generated threshold is based on the distribution of the one or more similarity values.

11. One or more non-transitory machine readable information storage mediums comprising one or more instructions which when executed by one or more hardware processors causes:
obtaining, by the one or more hardware processors, input data comprising (a) one or more software defect reports; (b) one or more software defect categories, each software defect category from the one or more software defect categories comprising a class label and associated textual description thereof, and (c) a corpus of documents;
segmenting, by the one or more hardware processors, input text of the one or more software defect reports into one or more segments based on the input data, each of the one or more segments comprises text content;
performing analysis on the corpus of documents obtained from one or more knowledge bases to identify a subset of relevant documents from the corpus of documents;
generating a concept space based on the identified subset of relevant documents;
projecting into the concept-space, by the one or more hardware processors, text content of the one or more segments pertaining to at least one of the one or more software defect reports and the textual description of the one or more software defect categories to generate a concept-space representation for each of the one or more software defect reports and the one or more software defect categories;
computing, by the one or more hardware processors, one or more similarities between the concept-space representation of each of the one or more software defect reports and each of the one or more software defect categories to obtain distribution of one or more similarity values specific to the one or more software defect reports to be classified;
performing, by the one or more hardware processors, a comparison of distribution of the one or more similarity values with a dynamically generated threshold; and
classifying by the one or more hardware processors, the one or more software defect reports into the one or more software defect categories based on the comparison.

12. The one or more non-transitory machine readable information storage mediums as claimed in claim 11, wherein the step of performing analysis comprises applying one or more document identification techniques on the corpus of documents obtained from the one or more knowledge bases to identify the subset of relevant documents.

13. The one or more non-transitory machine readable information storage mediums as claimed in claim 12, wherein the one or more document identification techniques comprises at least one of one or more graph-theoretic analysis, one or more keyword identification techniques and one or more text clustering techniques.

14. The one or more non-transitory machine readable information storage mediums as claimed in claim 11, wherein when the one or more similarity values are higher than the dynamically generated threshold, the one or more software defect reports are classified into the one or more software defect categories.

15. The one or more non-transitory machine readable information storage mediums as claimed in claim 11, wherein the dynamically generated threshold is based on the distribution of the one or more similarity values.

* * * * *